US005163747A

United States Patent [19]

Cheng

[11] Patent Number: 5,163,747

[45] Date of Patent: Nov. 17, 1992

[54] DESK LAMP STEREO OUTPUT DEVICE INCORPORATED THERETO

[76] Inventor: Wei-Kwang Cheng, 1590 Cortez St., Milpitas, Calif. 95035

[21] Appl. No.: 857,823

[22] Filed: Mar. 26, 1992

[51] Int. Cl.[5] .......... G01D 11/28

[52] U.S. Cl. .......... 362/86; 362/259

[58] Field of Search .......... 362/86, 259

[56] References Cited

U.S. PATENT DOCUMENTS 1,619,407 3/1927 Evers .......... 362/86 X 1,719,437 7/1929 Meuller .......... 362/86 X 2,278,835 4/1942 Crowley .......... 362/86 X

*Primary Examiner*—Allen M. Ostrager

*Attorney, Agent, or Firm*—Varndell Legal Group

[57] ABSTRACT

A desk lamp comprising a lamp socket having a radially slotted diffuser connected to an elongated socket body thereof supported on a speaker above a spherical ceramic sound chest and covered with a lamp shade to hold a lamp bulb. Output sound waves from said speaker are guided by a spherical rod and evenly distributed through the radial slots on said diffuser.

1 Claim, 2 Drawing Sheets

DESK LAMP STEREO OUTPUT DEVICE INCORPORATED THERETO

BACKGROUND OF THE INVENTION

The present invention relates to desk lamps. More particularly, the present invention relates to a desk lamp having a stereo output device incorporated thereto.

The sound chest of a stereo equipment is generally made from a wooden material in a rectangular shape. This structure of sound chest produces poor resonance and unfavorably affect the sound effect of a stereo equipment. Further, adding additional functions to a desk lamp has become an important factor to attract consumers.

SUMMARY OF THE INVENTION

The present invention has been accomplished under the aforesaid circumstances. It is therefore an object of the present invention to provide a desk lamp which uses a sound chest to serve as a lamp stand. It is another object of the present invention to provide a sound chest which eliminates the occurrence of resonance. According to the present invention, a sound chest is made from a ceramic material in a hollow spherical shape.

DETAILED DESCRIPTION OF THE PREFERRED EMBODIMENT

Figure 1:
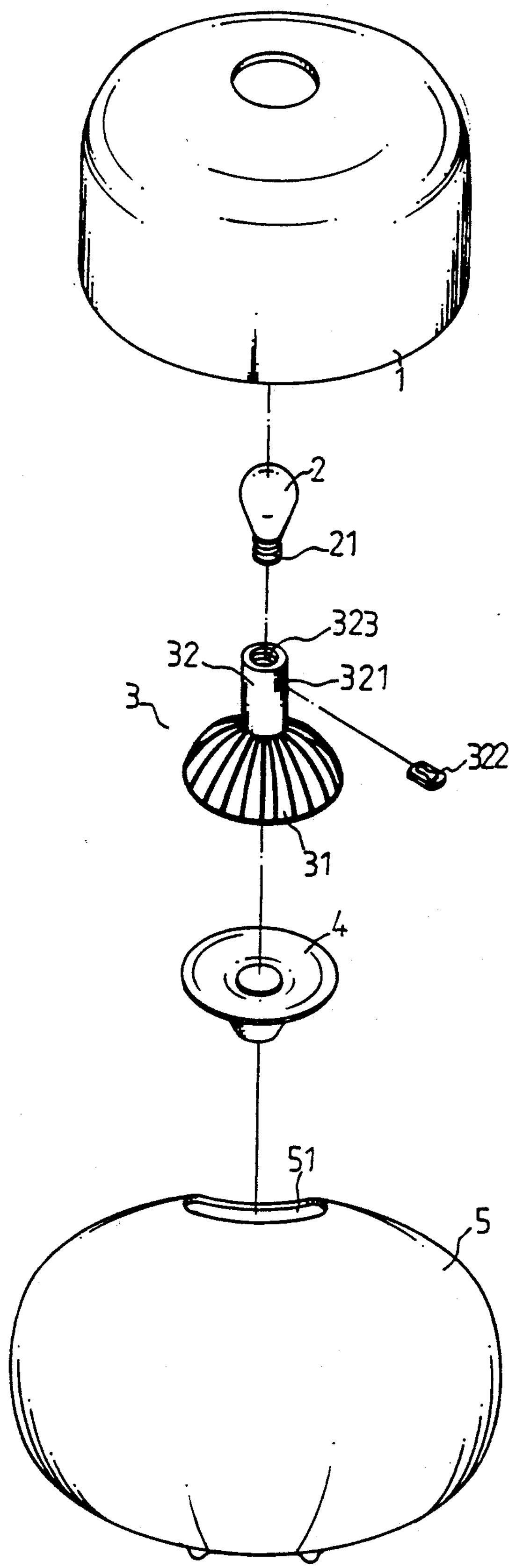
FIG. 1 is an exploded view of the preferred embodiment of the present invention.
Figure 3:
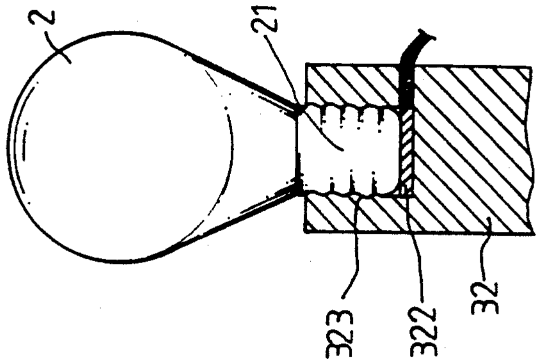
FIG. 3 is a sectional view assembly of the lamp bulb and the lamp socket in an enlarged scale.
Figure 2:
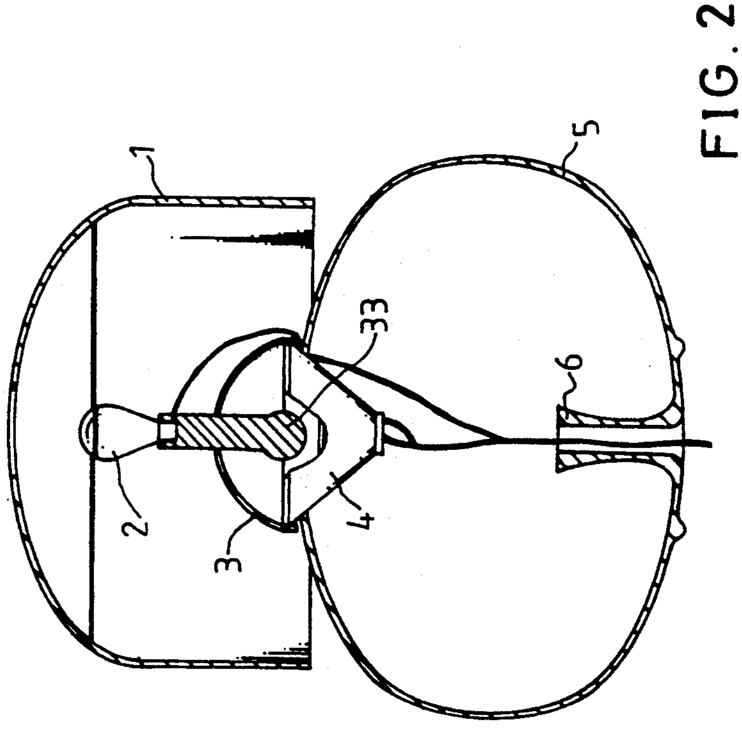
FIG. 2 is a longitudinally sectional view thereof.

Referring to FIGS. 1, 2 and 3, therein illustrated is a desk lamp as constructed in accordance with the present invention, which is generally comprised of a lamp shade 1, a lamp bulb 2, a lamp socket 3, a speaker 4, and a sound chest 5. The lamp socket 3 has a radially slotted diffuser 31 connected to the socket body 32. The socket body 32 of the lamp socket 3 has a top end formed into a conductive inner thread 323 for connecting the conductive outer thread 21 of the lamp bulb 2, and a bottom end formed into a spherical rod 33. A side hole 321 is made on the socket body 32 of the lamp socket 3 with a conductive plate 322 inserted therein. The conductive inner thread 323 and the conductive plate 322 are respectively connected to a power switch (not shown) by an electric wire. Once the lamp bulb 2 has been fastened in the socket body 32, the two opposite ends of the lamp socket 2 are respectively connected to the two opposite ends of a power switch. Therefore, switching on the power switch causes the lamp bulb 2 to produce light. The sound chest 5 is made from a ceramic material in the shape of a hollow sphere having a top opening 51 for holding the speaker 4, and a tubular inner flange 52 for inserting electric wires. Because the sound chest 5 is made from a ceramic material, it eliminates the occurrence of resonance.

Referring to FIG. 2 again, the speaker 4 is placed on the top opening 51 of the sound chest 5, the lamp socket 3 is placed on the speaker 4 to hold the lamp bulb 2, and then, the lamp shade 1 is covered over the lamp bulb 2 and the lamp socket 3. The electric wires from the lamp socket 3 and the speaker 4 are inserted through the top opening 51 and the tubular inner flange 52, wherein the electric wire from the lamp socket is connected to an electric power outlet through a power switch; the electric wire from the speaker 4 is connected to an audio equipment. Therefore, turning on the audio equipment causes the speaker 4 to produce sound waves. By means of the arrangement of the spherical rod 33 and the radially slotted diffuser 31, output sound waves produced through the speaker 4 are evenly distributed.

I claim:

1. A desk lamp comprised of a lamp socket supported on a sound chest above a speaker and covered by a lamp shade to hold a lamp bulb, and characterized in that said lamp socket has a radially slotted diffuser connected to an elongated socket body thereof and covered on said speaker, said socket body comprising a conductive inner thread at a top, a conductive plate inserted through a hole thereon, and an expanded, spherical bottom end, said conductive inner thread and said conductive plate being respectively connected to the positive and negative terminals of an external power supply by an electric wire; said sound chest is made from a ceramic material in a hollow spherical shape having an opening on a top edge thereof for holding said speaker and said lamp socket and a wire hole on a bottom edge thereof for inserting electric wires.

* * * * *

UNITED STATES PATENT AND TRADEMARK OFFICE

CERTIFICATE OF CORRECTION

PATENT NO. : 5,163,747

DATED : November 17, 1992

INVENTOR(S) : Wei-Kwang Cheng

It is certified that error appears in the above-indentified patent and that said Letters Patent is hereby corrected as shown below:

On the Title page, item [54] and col. 1, lines 1-2, change the title of the invention from "DESK LAMP STEREO OUTPUT DEVICE INCORPORATED THERETO" to --DESK LAMP WITH STEREO OUTPUT DEVICE INCORPORATED THERETO--.

Signed and Sealed this

Nineteenth Day of October, 1993

Attest:

Bruce Lehman

BRUCE LEHMAN

*Attesting Officer*

*Commissioner of Patents and Trademarks*